US012389947B2

(12) United States Patent
Force et al.

(10) Patent No.: US 12,389,947 B2
(45) Date of Patent: Aug. 19, 2025

(54) AEROSOL-GENERATING SYSTEM WITH MULTIPLE HEATING ELEMENTS

(71) Applicant: Altria Client Services LLC, Richmond, VA (US)

(72) Inventors: Eric Force, Bevaix (CH); Yonglu Guo, Shenzhen (CN); Yonghai Li, Shenzhen (CN)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/432,441

(22) Filed: Feb. 5, 2024

(65) Prior Publication Data

US 2024/0172797 A1 May 30, 2024

Related U.S. Application Data

(63) Continuation of application No. 18/052,761, filed on Nov. 4, 2022, now Pat. No. 11,903,420, which is a (Continued)

(30) Foreign Application Priority Data

Dec. 31, 2015 (EP) .................................... 15203248

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/44* (2020.01); *H05B 1/0244* (2013.01); *A24F 40/10* (2020.01); *H05B 2203/021* (2013.01)

(58) Field of Classification Search
CPC .......... H05B 1/02; H05B 1/0244; H05B 3/14; H05B 2203/02; A24F 47/00; A24F 47/008; A61M 11/00; A61M 5/00
See application file for complete search history.

(56) References Cited

U.S. PATENT DOCUMENTS

2008/0257367 A1 10/2008 Paterno et al.
2010/0229881 A1 9/2010 Hearn
(Continued)

FOREIGN PATENT DOCUMENTS

CN 203435687 U 2/2014
CN 104305527 A 1/2015
(Continued)

OTHER PUBLICATIONS

Chinese Board Decision dated Jul. 30, 2024 for corresponding Chinese Application No. 201680071535.5.
(Continued)

*Primary Examiner* — Brian W Jennison
(74) *Attorney, Agent, or Firm* — Harness, Dickey & Pierce, P.L.C.

(57) ABSTRACT

An aerosol-generating system includes a reservoir containing an aerosol-forming substrate. The system also includes first and second heating elements and first and second liquid transfer elements. The first and second heating elements are spaced apart from the reservoir. The first and second liquid transfer elements are configured to deliver aerosol-forming substrate from the reservoir to the heating elements. The first liquid transfer element has first and second end portions and a portion between the first and second end portions at the first heating element. The second liquid transfer element has first and second end portions and a portion between the first and second end portions at the second heating element. The portion of the first liquid transfer element at the first heating element may extend in a first direction. The portion of the (Continued)

second liquid transfer element at the second heating element may extend in a second direction.

20 Claims, 7 Drawing Sheets

Related U.S. Application Data continuation of application No. 16/804,958, filed on Feb. 28, 2020, now Pat. No. 11,490,658, which is a continuation of application No. 15/451,885, filed on Mar. 7, 2017, now Pat. No. 10,588,348, which is a continuation of application No. PCT/EP2016/082496, filed on Dec. 22, 2016.

(51) Int. Cl.

| | |
|---|---|
| ***A24F 40/44*** | (2020.01) |
| ***H05B 1/02*** | (2006.01) |

(56) References Cited

U.S. PATENT DOCUMENTS

| | | | | |
|---|---|---|---|---|
| 2011/0265806 | A1 | 11/2011 | Alarcon et al. | |
| 2011/0309157 | A1 | 12/2011 | Yang et al. | |
| 2013/0192621 | A1 | 8/2013 | Li et al. | |
| 2014/0000638 | A1 | 1/2014 | Sebastian et al. | |
| 2014/0123989 | A1* | 5/2014 | LaMothe | A61M 15/0003 131/328 |
| 2014/0209105 | A1 | 7/2014 | Sears et al. | |
| 2014/0366898 | A1 | 12/2014 | Monsees et al. | |
| 2015/0013702 | A1* | 1/2015 | Liu | A24F 40/46 131/329 |
| 2015/0059787 | A1 | 3/2015 | Qiu | |
| 2015/0083147 | A1 | 3/2015 | Schiff et al. | |

FOREIGN PATENT DOCUMENTS

| | | | |
|---|---|---|---|
| CN | 204232305 | U | 4/2015 |
| CN | 104738816 | A | 7/2015 |
| CN | 204579895 | U | 8/2015 |
| CN | 204907926 | U | 12/2015 |
| KR | 20100021595 | A | 2/2010 |
| RU | 2509516 | C2 | 3/2014 |
| RU | 150594 | U1 | 2/2015 |
| WO | WO-2014/150979 | A2 | 9/2014 |

OTHER PUBLICATIONS

Extended European Search Report #15203248,8-1656 dated Jun. 24, 2016.
International Search Report and Written Opinion for corresponding International application No. PCT/EP2016/082496 dated Jun. 21, 2017.
International Preliminary Report on Patentability issued Apr. 30, 2018 in International Application No. PCT/EP2016/082496.
Russian Notice of Allowance and Search Report for corresponding Application No. 2018127844, dated Apr. 24, 2020.
Chinese Office Action for corresponding Application No. 201680071535.5, dated Aug. 20, 2020.
International Search Report for Application No. PCT/EP2016/082496, dated Mar. 22, 2017.
Written Opinion for corresponding Application No. PCT/EP2016/082496, dated Feb. 2, 2018.
Japanese Office Action dated May 17, 2021 for corresponding Japanese Application No. 2018-534743, and English-language translation thereof.
Chinese Office Action dated May 13, 2021 for corresponding Chinese Application No. 201680071535.5, and English-language translation thereof.
Chinese Office Action dated Sep. 24, 2021 for corresponding Chinese Application No. 201680071535.5, and English-language translation thereof.
Chinese Office Action dated Jan. 24, 2022 for corresponding Chinese Application No. 201680071535.5, and English-language translation thereof.
European Office Action dated Feb. 11, 2022 for corresponding European Application No. 16816310.3.
South Korean Office Action dated Mar. 21, 2024, issued in corresponding Korean application No. 2018-7018091.
Office Action dated Mar. 27, 2024 issued in related Chinese Patent Application No. 201680071535.5.
South Korean Office Notice of Allowance dated Nov. 28, 2024, issued in corresponding Korean application No. 2018-7018091.

* cited by examiner

AEROSOL-GENERATING SYSTEM WITH MULTIPLE HEATING ELEMENTS

This is a continuation application of U.S. application Ser. No. 18/052,761, filed Nov. 4, 2022, which is a continuation application of U.S. application Ser. No. 16/804,958, filed Feb. 28, 2020, which is a continuation application of U.S. application Ser. No. 15/451,885, filed Mar. 7, 2017, which is a continuation of and claims priority to PCT/EP2016/082496 filed on Dec. 22, 2016, which claims priority to EP 15203248.8 filed on Dec. 31, 2015, the entire contents of each of which are incorporated herein by reference.

BACKGROUND

At least one example embodiment relates to electrically heated aerosol-generating systems configured to generate an aerosol and associated devices, articles and methods. At least one example embodiment relates to an electrically heated aerosol-generating system having multiple heating elements.

One type of aerosol-generating system is an electrically operated handheld vapor-generating system. Known handheld electrically operated vapor-generating systems may include a device portion comprising a battery and control electronics, and a replaceable cartridge portion comprising a supply of aerosol-forming substrate, and an electrically operated vaporizer. A cartridge comprising both a supply of aerosol-forming substrate and a vaporizer is sometimes referred to as a 'cartomizer'. The vaporizer may comprise a coil of heater wire wound around an elongate wick soaked in liquid aerosol-forming substrate. The cartridge portion often comprises not only the supply of aerosol-forming substrate and an electrically operated vaporizer, but also a mouthpiece, on which an adult vaper may draw.

Some aerosol-generating systems that include multiple heating elements have been proposed. For example, devices having multiple coil and wick elements have been proposed. Such devices may enable an increase in the amount of aerosol produced for each puff by the user on the device.

Efficient packing of device elements can be an important factor for aerosol generating devices. Such devices are commonly handheld and in many cases, a device having a small size may be desirable. The presence of multiple heating elements may undesirably increase the size of the device.

It would be desirable to provide an aerosol-generating system, such as a handheld electrically operated system, including multiple heating elements and that is configured to enhance packing efficiency. It would also be desirable for such systems to manage liquid and air flow in the system so as to seek to efficiently generate the aerosol.

SUMMARY

In at least one example embodiment, an aerosol-generating system comprises: a reservoir for containing an aerosol-forming substrate; a first heating element spaced apart from the reservoir in the direction of a longitudinal axis of the aerosol-generating system; and a second heating element spaced apart from the reservoir in the direction of the longitudinal axis. The aerosol-generating system further comprises: a first liquid transfer element having first and second end portions and a portion between the first and second end portions at the first heating element; and a second liquid transfer element having first and second end portions and a portion between the first and second end portions at the second heating element. The first and second end portions of the first liquid transfer element are configured to deliver aerosol-forming substrate from the reservoir to the first heating element. The first and second end portions of the second liquid transfer element are configured to deliver aerosol-forming substrate from the reservoir to the second heating element.

By spacing the first and second heating elements from the reservoir in the direction of a longitudinal axis of the aerosol-generating system, the heating elements and liquid transfer elements may be more efficiently packaged in the system and thus can allow for smaller size aerosol-generating systems. In at least one example embodiment, the reservoir, heating elements and liquid transfer elements may be arranged in an end-to-end arrangement along a longitudinal axis of the aerosol-generating system, which may enable the aerosol-generating system to be thinner, or have a reduced width, compared to other aerosol-generating systems having multiple heating elements.

In at least one example embodiment, a portion of the first liquid transfer element is arranged at the first heating element. The portion of the first liquid transfer element arranged at the first heating element is arranged relative to the first heating element such that the first heating element may transfer heat to the portion of the first liquid transfer element. Similarly, a portion of the second liquid transfer element is arranged at the second heating element. The portion of the second liquid transfer element arranged at the second heating element is arranged relative to the second heating element such that the second heating element may transfer heat to the portion of the second liquid transfer element. Thus, the portions of the first and second liquid transfer elements at the first and second heating elements may be described as being in thermal proximity to the first and second heating elements. In at least one example embodiment, the first heating element may be in physical contact with the portion of the first heating element between the first and second end portions of the first heating element. In some embodiments, the second heating element may be in physical contact with the portion of the second heating element between the first and second end portions of the second heating element.

In at least one example embodiment, the first and second end portions of the first liquid transfer element may be arranged in fluid contact with the reservoir and the first and second end portions of the second liquid transfer element may be arranged in fluid contact with the reservoir. The first and second end portions of the first liquid transfer element may be arranged in fluid contact with the reservoir at a first location and the first and second end portions of the second liquid transfer element may be arranged in fluid contact with the reservoir at a second location. The second location is spaced apart from the first location. The second location is spaced apart from the first location in the direction of the width of the aerosol-generating system.

In at least one example embodiment, the system may further comprise a liquid retention medium, as described in more detail later on. The liquid retention medium may be arranged in fluid contact with the reservoir. The liquid retention medium may be configured to deliver liquid aerosol-forming substrate from the reservoir to the first and second liquid transfer elements. The first and second end portions of the first liquid transfer element may be arranged in fluid contact with the liquid retention medium. The first and second end portions of the second liquid transfer element may also be arranged in fluid contact with the liquid retention medium. The first and second end portions of the first liquid transfer element may be arranged in fluid contact with the liquid retention medium at a first location and the first and second end portions of the liquid transfer element may be arranged in fluid contact with the liquid retention medium at a second location. The second location may be spaced apart from the first location. The second location may be spaced apart from the first location in the direction of the width of the aerosol-generating system.

As used herein, the terms 'fluid contact', 'fluid communication' and 'fluid connection' refer to parts, features or objects that are arranged relative to each other such that fluid may be transferred or communicated directly between the parts, features or objects that are in fluid contact, communication or connection.

In at least one example embodiment, the first liquid transfer element may be substantially U-shaped, C-shaped or V-shaped. In at least one example embodiment, the second liquid transfer element may be substantially U-shaped, C-shaped or V-shaped. The first and second liquid transfer elements may be substantially the same shape. The first and second liquid transfer elements may be different shapes.

In at least one example embodiment, the portion of the first liquid transfer element at the first heating element may extend substantially in a first direction and the portion of the second liquid transfer element at the second heating element may extend substantially in a second direction. The first and second end portions of the first heating element may extend substantially in a third direction, the third direction being different to the first direction. The first and second end portions of the second heating element may extend substantially in a fourth direction, the fourth direction being different to the second direction.

In at least one example embodiment, the first direction may be the same as the second direction. In at least one example embodiment, the first and second liquid transfer elements may be spaced apart in a direction substantially transverse to the longitudinal axis of the aerosol-generating system. In at least one example embodiment, the first and second liquid transfer elements may be spaced apart in the direction of the width of the aerosol-generating system. In at least one example embodiment, the first direction may be different from the second direction, as described in more detail below.

In at least one example embodiment, the first and second directions are substantially perpendicular to the longitudinal axis of the aerosol-generating system. In at least one example embodiment, the third and fourth directions are substantially parallel to the longitudinal axis. In at least one example embodiment, the third and fourth directions are substantially the same direction. In at least one example embodiment, the first and second end portions of the first liquid transfer element may extend from the first heating element to the reservoir or the liquid transfer medium. In at least one example embodiment, the first and second end portions of the second liquid transfer element may extend from the second heating element to the reservoir or the liquid transfer element.

In at least one example embodiment, the spacing or distance between the first heating element and the reservoir may be the same.

In at least one example embodiment, the spacing or distance between the first heating element and the reservoir may be different. In at least one example embodiment, one of the first and second heating elements may be spaced at a greater distance from the reservoir than the other, in the direction of the longitudinal axis of the system. As such, the first and second end portions of one of the first and second heating elements may be longer than the first and second end portions of the other heating element. Thus, the first and second heating elements may be located at different longitudinal positions of an airstream flow path through the system, which would place one of the first and second heating elements upstream of the other heating element. More efficient mass transfer of aerosol may occur by the longitudinal spacing of the heating elements.

The first end portion of the first liquid transfer element may comprise a first end and the second end portion of the first liquid transfer element may comprise a second end. The first end portion of the second liquid transfer element may comprise a first end and the second end portion of the second liquid transfer element may comprise a second end. The first and second ends of the first liquid transfer element may lie substantially on a common plane. The first and second ends of the second liquid transfer element may lie substantially on a common plane. In at least one example embodiment, the first and second ends of the first and second liquid transfer elements may lie substantially on a common plane.

Arranging the ends of the first and second liquid transfer elements substantially on a common plane may further improve packaging efficiently in the aerosol-generating system and may allow for smaller size aerosol-generating systems. In at least one example embodiment, arranging the ends of the first and second liquid transfer elements on a common plane may facilitate an end-to-end arrangement of the first and second liquid transfer elements and the reservoir.

In at least one example embodiment, the system comprises a vaporizing unit including the first and second liquid transfer elements and the first and second heating elements. The vaporizing unit may be configured to be releasably connected to a reservoir. The vaporizing unit may be configured to be arranged in an end-to end relationship with a reservoir along the longitudinal axis of the aerosol-generating system.

At least one example embodiment relates to a vaporizing unit for an aerosol-generating system. The vaporizing unit comprises: a reservoir connecting end configured to be releasably connected to a source of liquid aerosol-forming substrate; a first heating element spaced apart from the reservoir connecting end in the direction of a longitudinal axis of the vaporizing unit; and a second heating element spaced apart from the reservoir connecting end in the direction of the longitudinal axis. The vaporizing unit further comprises: a first liquid transfer element having first and second end portions and a portion between the first and second end portions at the first heating element; and a second liquid transfer element having first and second end portions and a portion between the first and second end portions at the second heating element. The first and second end portions of the first liquid transfer element are configured to deliver liquid aerosol-forming substrate to the first heating element from a source of liquid aerosol-forming substrate when a source of liquid aerosol-forming substrate is connected to the vaporizing unit at the reservoir connecting end. The first and second end portions of the second liquid transfer element are configured to deliver liquid aerosol-forming substrate to the second heating element from a source of liquid aerosol-forming substrate when a source of liquid aerosol-forming substrate is connected to the vaporizing unit at the reservoir connecting end.

The vaporizing unit may further comprise a liquid retention medium. The liquid retention medium may be configured to deliver liquid aerosol-forming substrate from a source of liquid aerosol-forming substrate when a source of liquid aerosol-forming substrate is connected to the vaporizing unit at the reservoir connecting end. The liquid retention medium may be arranged at the reservoir connecting end of the vaporizing unit. The first and second end portions of the first liquid transfer element may be arranged in fluid contact with the liquid retention medium. The first and second end portions of the second liquid transfer element may be arranged in fluid contact with the liquid retention medium.

The portion of the first liquid transfer element at the first heating element may extend substantially in a first direction. The portion of the second liquid transfer element at the first heating element may extend substantially in a second direction. The first and second end portions of the first heating element may extend substantially in a third direction. The third direction is different from the first direction. The first and second end portions of the second heating element may extend substantially in a fourth direction. The fourth direction is different from the second direction.

The first and second directions may be substantially perpendicular to the longitudinal axis. In at least one example embodiment, the first and second directions may be the same. Where the first and second directions are the same, the first and second liquid transfer elements may be spaced apart from each other in a direction substantially perpendicular to the longitudinal axis of the vaporizing unit. In at least one example embodiment, the first and second directions may be different.

The third and fourth directions may be substantially parallel to the longitudinal axis. In at least one example embodiment, the third and fourth directions may be the same. Where the third and fourth directions are the same, the first and second ends of the first and second liquid transfer elements may extend substantially from the first and second heating elements towards the reservoir connecting end of the vaporizing unit.

The first end portion of the first liquid transfer element may comprise a first end and the second end portion of the first liquid transfer element may comprise a second end. The first end portion of the second liquid transfer element may comprise a first end and the second end portion of the second liquid transfer element may comprise a second end. The first and second ends of the first liquid transfer element may lie substantially on a common plane. The first and second ends of the second liquid transfer element may lie substantially on the common plane. This may enable the vaporizing unit to be releasably connected to a source of liquid aerosol-forming substrate regardless of the relative orientations of the vaporizing unit and the source of liquid aerosol-forming substrate.

At least one example embodiment relates to an aerosol-generating system. The aerosol-generating system comprises a reservoir containing an aerosol-forming substrate. The system includes first and second heating elements and first and second liquid transfer elements. The first and second liquid transfer elements are configured to deliver aerosol-generating liquid to first and second heating elements. The first liquid transfer element extends in a first direction at the first heating element. The second liquid transfer element extends in a second direction at the second heating element. The first and second directions are different. The first direction may be substantially perpendicular to the second direction.

At least one example embodiment relates to a vaporizer unit for an aerosol-generating system. The vaporizer unit comprises first and second heating elements and first and second liquid transfer elements. The first and second liquid transfer elements are configured to deliver aerosol-generating liquid to first and second heating elements. The first liquid transfer element extends in a first direction at the first heating element. The second liquid transfer element extends in a second direction at the second heating element. The first and second directions are different. The first direction may be substantially perpendicular to the second direction.

By orienting the liquid transfer elements in different directions, the liquid transfer elements may be more efficiently packaged in the system and thus can allow for smaller size vaporizing units. In addition, air flow across heating elements having liquid transfer elements oriented in different directions may provide more efficient transfer of aerosol to the air stream than for example where parallel liquid transfer elements are present.

At least some example embodiments provide, among other things, systems that use electrical energy to heat a substrate, generally without combusting the substrate, to form an aerosol that may be inhaled by an adult vaper. The systems may be sufficiently compact to be considered hand-held systems. In at least one example embodiment, the system may be an can be characterized as smoking aerosol-generating article. As used herein, the term "aerosol-generating article" includes an article that can deliver a nicotine-containing aerosol for inhalation by an adult vaper.

The terms 'aerosol-generating system', 'aerosol-generating article' and 'aerosol-generating assembly' refer to a system, an article or an assembly comprising an aerosol-forming substrate that releases volatile compounds to form an aerosol that may be inhaled by an adult vaper. The term 'aerosol-forming substrate' refers to a substrate configured to release, upon heating, volatile compounds, which may form an aerosol.

Any suitable aerosol-forming substrate may be used with the systems. Suitable aerosol-forming substrates may comprise plant-based material. For example, an aerosol-forming substrate may comprise tobacco or a tobacco-containing material containing volatile tobacco flavour compounds, which are released from the aerosol-forming substrate upon heating. In addition or alternatively, an aerosol-forming substrate may comprise a non-tobacco containing material. An aerosol-forming substrate may comprise homogenized plant-based material. An aerosol-forming substrate may comprise at least one aerosol former. An aerosol-forming substrate may comprise other additives and ingredients such as flavorants. An aerosol-forming substrate may comprise nicotine. An aerosol-forming substrate may be liquid at room temperature. For example, an aerosol forming substrate may be a liquid solution, suspension, dispersion or the like. In at least one example embodiment, an aerosol-forming substrate comprises glycerol, propylene glycol, water, nicotine and, optionally, one or more flavorant.

The aerosol-forming substrate may be stored in a liquid storage portion of a system. The liquid storage portion may comprise a reservoir that contains the aerosol-forming substrate. The reservoir may comprise a liquid retention medium for example a porous material for storing liquid. The porous material may for example comprise a fibrous or spongy material, for example comprising polymer fibers, for example polyethylene terephthalate (PET). The liquid storage portion may comprise a housing defining the reservoir. The housing may be a rigid housing. As used herein 'rigid housing' means a housing that is self-supporting. The housing may be formed of any suitable material or combination of materials, such as a polymeric material, a metallic material, or glass. The housing of the liquid storage portion or cartridge may be formed by a thermoplastic material. Any suitable thermoplastic material may be used. One suitable thermoplastic material is acrylonitrile butadiene styrene.

The liquid storage portion may comprise an opening in communication with the reservoir through which the aerosol-forming substrate may be introduced into the reservoir or removed, such as by flowing, from the reservoir. The opening may be at the distal end. The terms 'distal,' 'upstream,' 'proximal,' and 'downstream' are used to describe the relative positions of components, or portions of components, of an aerosol-generating system. Aerosol-generating systems may have a proximal end through which, in use, an aerosol exits the system for delivery to an adult vaper, and may have an opposing distal end. The proximal end of the aerosol-generating system may also be referred to as the mouth end. In use, an adult vaper draws on the proximal end of the aerosol-generating system. The terms upstream and downstream are relative to the direction of aerosol movement through the aerosol-generating system when an adult vaper draws on the proximal end.

The term 'longitudinal' is used to describe the direction between the mouth end and the distal end of the aerosol-generating system. The system may have a length in the longitudinal direction. The system may have a longitudinal axis, along which the length of the system may be measured. The term 'length' is used to describe the maximum dimension in the longitudinal direction of the aerosol-generating system.

The term 'transverse' is used to describe the direction perpendicular to the longitudinal direction. The terms 'width' and 'diameter' are used to describe the maximum dimension in the transverse direction of the aerosol-generating system.

The liquid storage portion may be part of a consumable cartridge, capsule or liquid store, which an adult vaper can discard when the supply of the aerosol-forming substrate in the reservoir is diminished or depleted. The cartridge or capsule can then be replaced with another cartridge or capsule having a reservoir filled to an appropriate amount with aerosol-forming substrate. The housing of the liquid storage portion discussed above may be the housing of the cartridge or capsule.

The cartridge may, optionally, further include the liquid transfer elements, one or more heating element or both the liquid transfer elements and the one or more heating element. The liquid transfer elements and one or more heating element may be present in a vaporizing unit separate from the capsule or liquid store. The separate vaporizing unit and the capsule or liquid store may be releasably connectable. As used herein, 'releasably connectable' means that the releasably connectable parts may be connected to, and disconnected from each other, without significantly damaging either part. The parts may be connected and disconnected without any damage to either part. The capsule or liquid store may be connected to the vaporizing unit in any suitable manner, such as threaded engagement, snap-fit engagement, interference-fit engagement, magnetic engagement, or the like.

In some example embodiments, the liquid transfer elements may be in fluid contact with the reservoir. In some example embodiments, the system may further comprise a liquid retention medium. The liquid retention medium may be in fluid contact with the reservoir. The liquid transfer elements may be in fluid contact with the liquid retention medium. The first and second end portions of the first and second liquid transfer elements may be in fluid contact with the liquid retention medium.

If the system comprises a separate vaporizing unit and capsule or liquid store comprising the liquid storage portion, the liquid storage portion may comprise a valve positioned relative to the distal end portion opening to substantially prevent and/or reduce the aerosol generating material from exiting the reservoir when the capsule is not connected to the vaporizing unit. The valve may be actuatable such that the act of connecting the capsule to the vaporizing unit causes the valve to opening and disconnecting the capsule from the vaporizing unit causes the valve to close. Any suitable valve may be used. One suitable valve is described in Chinese Patent Application Publication No. CN 104738816 A, which describes a rotary valve assembly. In the rotary valve assembly, a rotatable valve including a liquid outlet is arranged at an outlet end of a liquid retention medium or a liquid storage element. A connection element is provided which can be arranged in the liquid outlet of the valve. Rotation of the connection element on connection of the liquid retention medium or liquid storage element effects rotation of the valve to align the liquid outlet of the valve with an outlet of a liquid reservoir to allow passage of the liquid from the reservoir to a liquid inlet associated with a heater element. When the liquid retention medium or liquid storage element is removed, rotation of the connection element rotates the valve back to seal the liquid outlet of the reservoir.

If the one or more heating elements and the liquid transfer elements are contained in a vaporizing unit separate from the capsule, the vaporizing unit may further comprise a housing in which the heating elements and liquid transfer elements are disposed. The vaporizing unit may include an element that interacts with the valve of the capsule to open the valve and place the liquid transfer elements in fluid communication with the reservoir when the capsule is connected to the vaporizing unit. The housing of the vaporizing unit may be a rigid housing. At least a portion of the housing may comprise a thermoplastic material, a metallic material, or a thermoplastic material and a metallic material.

The capsule, regardless of whether it includes the liquid transfer elements, may comprise a liquid retention medium. The liquid retention medium may comprise liquid storage or liquid transfer material. A 'liquid transfer material' is a material that conveys liquid from one portion of the material to another. The liquid transfer material may comprise a capillary material. The liquid transfer material may be configured to convey liquid from the reservoir to the liquid transfer element. Liquid transfer material may have a fibrous or spongy structure. The liquid transfer material may include a bundle, mat or other structure comprising fibers or filaments. In at least one example embodiment, the liquid transfer material may comprise a plurality of fibers or threads. The fibers or threads may be generally aligned to convey the liquid in the aligned direction. The liquid transfer material may comprise sponge-like or foam-like material. The liquid transfer material may comprise any suitable material or combination of materials. Suitable materials may include a sponge or foam material, ceramic, glass or graphite-based materials in the form of fibers or sintered powders, foamed metal or plastics material, a fibrous material, for example made of spun or extruded fibers, such as cellulose acetate, polyester, or bonded polyolefin, polyethylene, terylene or polypropylene fibers, nylon fibers or ceramic.

Regardless of whether the liquid transfer elements are in a vaporizing unit separate from the capsule or are included in a cartridge with the aerosol-forming substrate, the liquid transfer elements may be formed from any suitable liquid transfer material. In at least one example embodiment, the liquid transfer material may comprise a capillary material as previously discussed in relation to the capsule except that the liquid transfer material of the vaporizer unit may be suitable for contact with a heating element. In at least one example embodiment, the liquid transfer elements may comprise fused silica or a porous ceramic material.

The liquid transfer elements may each include first and second portions in fluid contact with the reservoir and a portion in contact with a heating element. The portion in contact with the heating element is between the first and second portions. The first and second portions may extend substantially parallel to the longitudinal axis of the system, and the portion in contact with the heating element may extend substantially transverse to the longitudinal axis of the system.

A portion of the first liquid transfer element at the first heating element extends in a direction different than that of a portion of the second liquid transfer element at the second heating element. The direction that the portion of the first liquid transfer element extends may be perpendicular to the direction that the portion of the second liquid transfer element extends. The distance from the second heating element to the reservoir may be greater than the distance from the first heating element to the reservoir, and thus may be located at different longitudinal positions of an airstream flow path through the system, which would place the second heating element upstream of the first heating element.

More efficient mass transfer of aerosol may occur by the non-aligned arrangement of liquid transfer elements. In at least one example embodiment, the surface area of the liquid transfer elements, including the portions of the liquid transfer elements at the heating elements, that may experience efficient contact within the air stream may be greater than if the liquid transfer elements were stacked in an aligned orientation because the portion of the second liquid transfer element at the second heating element may block some air flow to the downstream and aligned portion of the first liquid transfer element at the first heating element.

In some example embodiments, there may be provided an aerosol-generating system comprising: a reservoir for containing an aerosol-forming substrate; a first heating element; and a second heating element. The system may further comprise a first liquid transfer element configured to deliver aerosol-forming substrate from the reservoir to the first heating element, the first liquid transfer element having a portion extending in a first direction at the first heating element. The system may further comprise a second liquid transfer element configured to deliver aerosol-forming substrate from the reservoir to the second heating element, the second liquid transfer element having a portion extending in a second direction at the second heating element. The first and second directions may be different. The distance from the reservoir to the second heating element at the second liquid transfer element may be greater than the distance from the reservoir to the first heating element of the first liquid transfer element.

In some example embodiments, a vaporizing unit for an aerosol-generating system comprises: a reservoir connecting end configured to be releasably connected to a source of liquid aerosol-forming substrate; a first heating element spaced apart from the reservoir connecting end in the direction of a longitudinal axis of the vaporizing unit; and a second heating element spaced apart from the reservoir connecting end in the direction of the longitudinal axis. The vaporizing unit may further comprise a first liquid transfer element configured to deliver liquid aerosol-forming substrate aerosol-forming substrate to the first heating element from a source of liquid aerosol-forming substrate when a source of liquid aerosol-forming substrate is releasably connected to the reservoir connecting end. The vaporizing unit may further comprise a second liquid transfer element configured to deliver liquid aerosol-forming substrate to the second heating element from a source of liquid aerosol-forming substrate when a source of liquid aerosol-forming substrate is releasably connected to the reservoir connecting end. The first liquid transfer element may have a portion extending in a first direction at the first heating element. The second liquid transfer element may have a portion extending in a second direction at the second heating element. The first and second directions are different. The distance from the reservoir connecting end to second heating element at the second liquid transfer element may be greater than the distance from the reservoir connecting end to the first heating element at the first liquid transfer element.

The material, shape, size, and construction of the first and second liquid transfer elements may be the same or different. The first and second liquid transfer elements may be of a suitable material, shape, size and construction such that both liquid transfer elements remain wet until the aerosol-forming substrate in the reservoir is depleted. For example, one or both of the materials and cross-sectional areas of the liquid transfer elements or portions of the liquid transfer elements may be varied to maintain wetness until the reservoir is depleted in both liquid transfer elements despite the distance of portions of the liquid transfer elements to the reservoir being different. The rate of transfer of liquid aerosol-forming substrate from the reservoir to the portion of the first and second liquid transfer elements in respective contact with the first and second heating elements may be substantially the same. Thus, the capacity of the liquid transfer material of the second liquid transfer element, which may be further from the reservoir at the second heating element, may be greater than the capacity of the liquid transfer material of the second liquid transfer element, which may be closer to the reservoir at the first heating element. In at least one example embodiment, the second liquid transfer element may have a cross-sectional area greater than the cross-sectional area of the first liquid transfer element or the second transfer element may comprise material having a greater liquid transfer capacity that the first liquid transfer element. The first and second portions of each of the first and second liquid transfer elements may carry liquid aerosol-forming substrate to the portions of the first and second liquid transfer elements at the heating elements. The first and second portions of each of the first and second liquid transfer elements may be in contact with the heating elements. First and second ends of each liquid transfer element may be in contact with a liquid retention material such as a fibrous sponge or pad. The liquid retention material may be in fluid communication with the liquid aerosol-forming substrate in the reservoir. The first and second ends of the first liquid transfer element may be located at different positions, which provides different locations for feeding the liquid transfer element with liquid aerosol-forming substrate. The first and second ends of the second liquid transfer element may also be located at different positions. The first and second ends of the first liquid transfer element and the first and second ends of the second liquid transfer element may be located at different positions from each other so that each end of each liquid transfer element is fed from a different location. Each end of each liquid transfer element may be longitudinally aligned with an opening in communication with the reservoir. Such an orientation may enhance feeding of the liquid transfer elements relative to liquid transfer elements that share a feeding location and may enhance mass transfer of an aerosol generated from the liquid substrate carried by the liquid transfer elements to an airstream through the system.

At least a portion of the liquid transfer element is located sufficiently close to the heating element so that liquid aerosol-forming substrate carried by the liquid transfer element may be heated by the heating element to generate an aerosol. At least a portion of the liquid transfer element, such as a portion between the first and second ends, may be in contact with the heating element.

Any suitable heating element may be employed. For example, the heating element may comprise a resistive filament. The term 'filament' is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner. One or more resistive filament may form a coil, mesh, array, fabric or the like. Application of an electric current to the heating element results in heating due to the resistive nature of the element. In at least one example embodiment, the heating element forms a coil that is wrapped around a liquid transfer element. The liquid transfer element may comprise a wick.

A heating element may comprise any suitable electrically resistive filament. In at least one example embodiment, a heating element may comprise a nickel-chromium alloy.

A separate heating element may be associated with each liquid transfer element. The system may be configured such that the heating element associated with the first liquid transfer element and the heating element associated with the second liquid transfer element are heated at the same or different temperatures and for the same or different amounts of time. The heating elements may be independently controlled by electronic circuitry, by the nature, size and shape of the material selected (for example, to tune resistance), or the like. The heating elements may be arranged in series or in parallel or may be separately coupled to control electronic circuitry.

In at least one example embodiment, a system may include one or more air inlet to allow air to enter the system to carry aerosol generated by heating of substrate carried by the liquid transfer elements though a mouth end opening when an adult vaper draws on the mouth end. The air inlets are upstream of the liquid transfer elements. The air inlets may be formed in a housing of a cartridge, if the cartridge includes the liquid transfer elements, a vaporizing unit, a part including a power supply or other suitable part of the system.

The vaporizing unit, or cartridge if the liquid transfer elements and heating elements are included in the cartridge, may comprise electrical contacts for electrically coupling the heating element to the power supply or other control electronics in a separate part of the system.

The vaporizing unit or the cartridge may be releasably connectable with the part containing the power supply. The vaporizing unit or the cartridge may be connected to the part containing the power supply in any suitable manner, such as threaded engagement, snap-fit engagement, interference-fit engagement, magnetic engagement, or the like.

The part containing the power supply may comprise a housing and the power supply may be disposed in the housing. The power supply may comprise a battery. The part may also comprise electronic circuitry disposed in the housing and electrically coupled to the power supply. The part may comprise contacts such that the contacts of the part electrically couple with the contacts of the vaporizing unit when the first part is connected with the vaporizing unit or cartridge. The contacts of the part are electrically coupled to the electronic circuitry and power supply. Thus, when the part is connected to the vaporizing unit or cartridge, the heating element may be electrically coupled to the power supply and circuitry.

The electronic circuitry may be configured to control delivery of an aerosol resulting from heating of the substrate to the adult vaper. Control electronic circuitry can be provided in any suitable form and may, for example, include a controller or a memory and a controller. The controller can include one or more of an Application Specific Integrated Circuit (ASIC) state machine, a digital signal processor, a gate array, a microprocessor, or equivalent discrete or integrated logic circuitry. Control electronic circuitry can include memory that contains instructions that cause one or more components of the circuitry to carry out a function or aspect of the control circuitry. Functions attributable to control circuitry can be embodied as one or more of software, firmware, and hardware.

The electronic circuitry may be configured to control the supply of power to the heating element dependent on the electrical resistance of the heating element or the one or more filaments.

The electronic circuitry may comprise a microprocessor, which may be a programmable microprocessor. The electronic circuitry may be configured to regulate a supply of power.

The part that includes the power supply may include a switch to activate the system. In at least one example embodiment, the part may include a button that can be depressed to activate or optionally deactivate the system.

An aerosol-generating system may include a cover that is disposable over at least the capsule or cartridge. For example, the cover includes a distal end opening that is configured to receive the capsule or cartridge. The cover may also extend over at least a portion of the vaporizing unit if the system includes a separate vaporizing unit, and may also extend over at least a portion of the part that contains the power supply. In at least one example embodiment, the system includes a separate capsule and vaporizing unit and the cover extends over the capsule and the vaporizing unit and abuts a proximal end of the part containing the power supply. In at least one example embodiment, the cover may extend over the capsule and abut a proximal end of the vaporizing unit. The cover may be releasably securable in a position relative to at least the capsule. The cover may be releasably connectable to the capsule, the vaporizing unit if present, or the part containing the power supply to be retained in a position relative to the capsule. The cover may be connected to the capsule, vaporizing unit or part containing the power supply in any suitable manner, such as threaded engagement, snap-fit engagement, interference-fit engagement, magnetic engagement, or the like.

If the cover extends over an air inlet in the cartridge, the vaporizing unit or the part comprising the power supply, a sidewall of the cover may define one or more air inlets to allow air to enter the air inlet in the cartridge, the vaporizing unit or the part comprising the power supply.

The cover may define the mouth end of the aerosol-generating system. The cover may be generally cylindrical and taper inwardly towards the mouth end. The cover may comprise one part or multiple parts. In at least one example embodiment, the cover may include a distal part and a releasable connectable proximal part that may serve as a mouthpiece. The cover may define a mouth end opening to allow aerosol resulting from heating of the aerosol-forming substrate to exit the device.

The cover may comprise a rigid elongate housing. The housing may comprise any suitable material or combination of materials. Examples of suitable materials include metals, alloys, plastics or composite materials containing one or more of those materials, or thermoplastics that are suitable for food or pharmaceutical applications, such as polypropylene, polyetheretherketone (PEEK) and polyethylene.

An aerosol-generating system, when all parts are connected, may have any suitable size. In at least one example embodiment, the system may have a length ranging from about 50 mm to about 200 mm. The system may have a length ranging from about 100 mm to about 190 mm. The system may have a length ranging from about 140 mm to about 170 mm.

All scientific and technical terms used herein have meanings commonly used in the art unless otherwise specified. The definitions provided herein are to facilitate understanding of certain terms used frequently herein.

As used herein, the singular forms ‘a’, ‘an’, and ‘the’ encompass embodiments having plural referents, unless the content clearly dictates otherwise.

As used herein, ‘or’ is generally employed in its sense including ‘and/or’ unless the content clearly dictates otherwise. The term ‘and/or’ means one or all of the listed elements or a combination of any two or more of the listed elements.

As used herein, ‘have’, ‘having’, ‘include’, ‘including’, ‘comprise’, ‘comprising’ or the like are used in their open ended sense, and generally mean ‘including, but not limited to’. It will be understood that ‘consisting essentially of’, ‘consisting of’, and the like are subsumed in ‘comprising,’ and the like.

It will be appreciated that features described in respect of one example embodiment may also be applicable to other aspects of the invention.

BRIEF DESCRIPTION OF THE DRAWINGS

Reference will now be made to the drawings, which depict one or more features described in this disclosure. However, it will be understood that other features not depicted in the drawings fall within the scope of this disclosure. Like numbers used in the figures refer to like components, steps and the like. However, it will be understood that the use of a number to refer to a component in a given figure is not intended to limit the component in another figure labeled with the same number. In addition, the use of different numbers to refer to components in different figures is not intended to indicate that the different numbered components cannot be the same or similar to other numbered components.

Figure 1A:
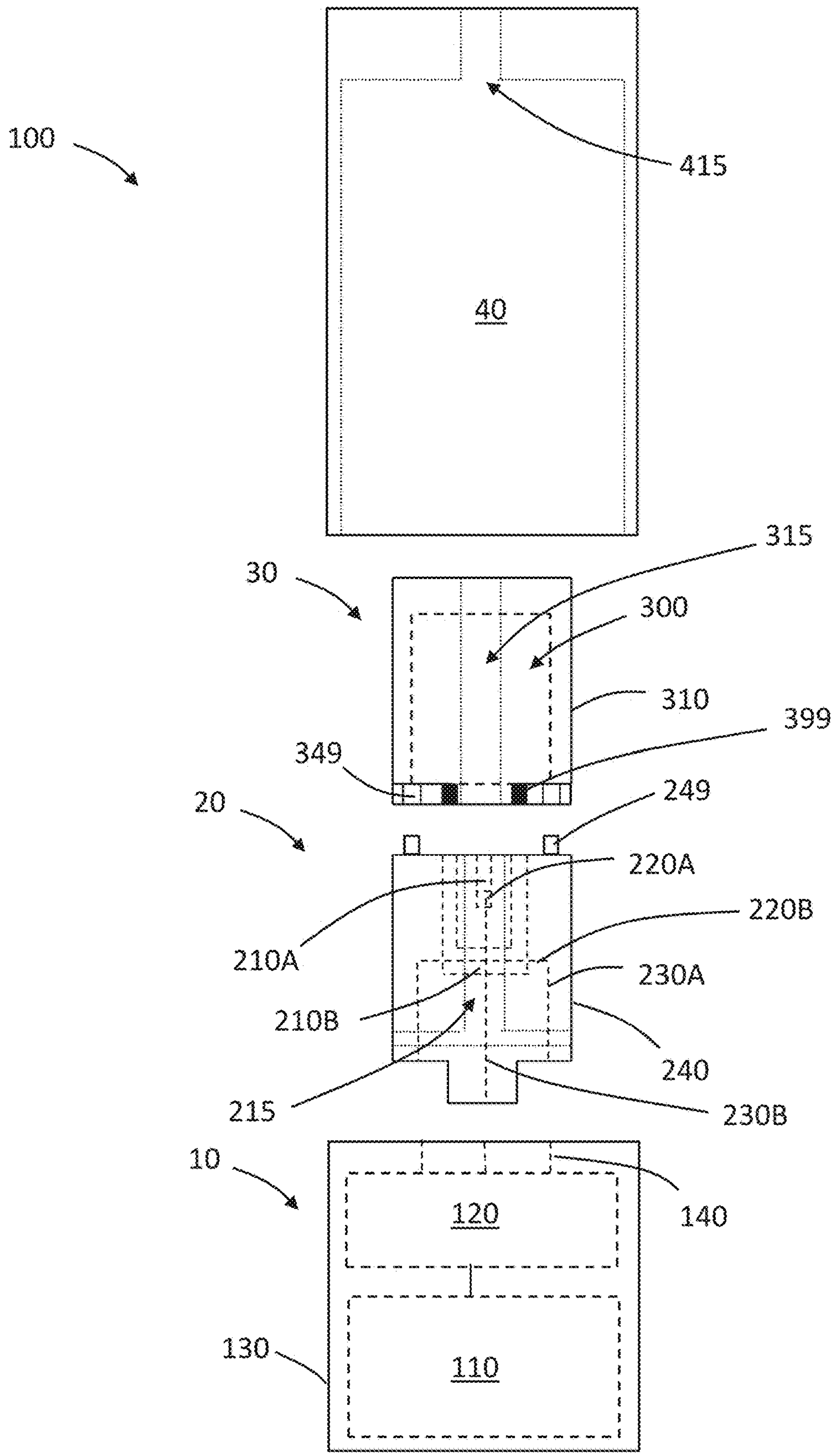
FIG. 1A is a side view of disconnected parts and cover, and illustrates internal components of the parts according to at least one example embodiment.

The schematic drawings are not necessarily to scale and are presented for purposes of illustration and not limitation.

DETAILED DESCRIPTION

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term “and/or” includes any and all combinations of one or more of the associated listed items.

It will be understood that, if an element is referred to as being “connected” or “coupled” to another element, it can be directly connected, or coupled, to the other element or intervening elements may be present. In contrast, if an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

The terminology used herein is for the purpose of describing particular embodiments only and is not intended to be limiting of example embodiments. As used herein, the singular forms “a,” “an” and “the” are intended to include the plural forms as well, unless the context clearly indicates otherwise. It will be further understood that the terms “comprises,” “comprising,” “includes” and/or “including,” if used herein, specify the presence of stated features, integers, steps, operations, elements and/or components, but do not preclude the presence or addition of one or more other features, integers, steps, operations, elements, components and/or groups thereof.

Spatially relative terms (e.g., “beneath,” “below,” “lower,” “above,” “upper” and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Figure 1B:
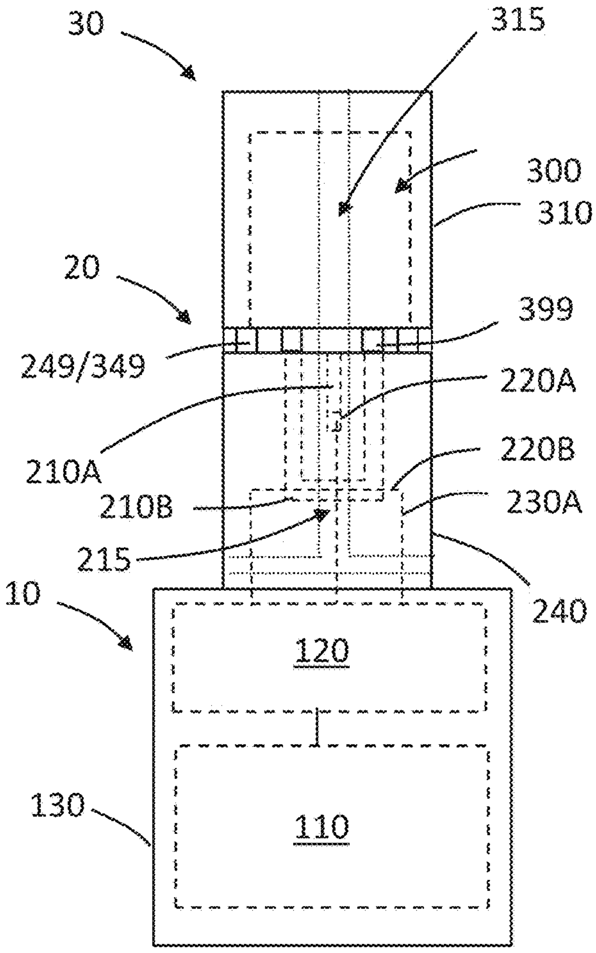
FIG. 1B is a side view of connected parts illustrating internal components of the parts according to at least one example embodiment.
Figure 1C:
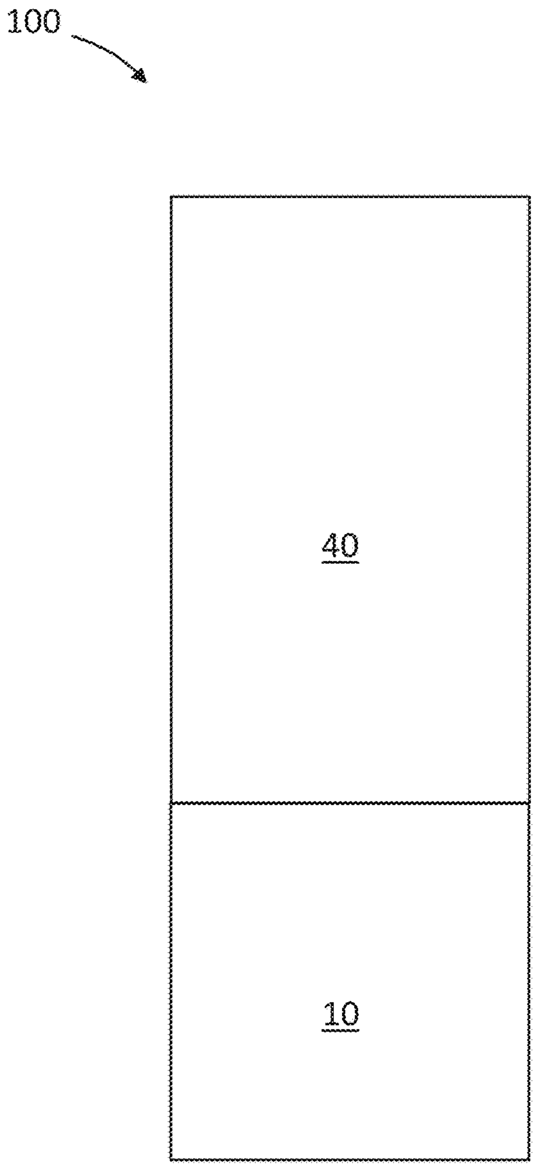
FIG. 1C is a side view of connected parts showing only exterior portions of the cover and part containing a power supply according to at least one example embodiment.

Referring now to FIGS. 1A-C, an aerosol-generating system 100 includes a first part 10, a vaporizing unit 20, a capsule 30, and a cover 40. The first part 10 is releasably connectable to the vaporizing unit 20. The vaporizing unit 20 is releasably connectable to the capsule 30. The cover 40 is disposable over the vaporizing unit 20 and capsule 30. The cover 40 is releasable securable in a position relative to the vaporizing unit 20 and capsule 30. In at least one example embodiment, (not depicted) the components of the vaporizing unit and capsule, may comprise a single unit.

The first part 10 comprises a housing 130 in which a power supply 110 and electronic circuitry 120 are disposed. The electronic circuitry 120 is electrically coupled to the power supply 110. Electrical conductors 140 may connect contacts (not shown) for example exposed through, positioned on, or integral to the housing 130.

The vaporizing unit 20 comprises a housing 240 in which liquid transfer elements 210A, 210B and heating elements 220A, 220B are disposed. The first liquid transfer element 210A is substantially U-shaped, having first and second end portions and a central portion between the first and second end portions. The central portion of the first liquid transfer element 210A is in thermal connection with the first heating element 220A. The second liquid transfer element 210B is also substantially U-shaped, having first and second end portions and a central portion between the first and second end portions. The central portion of the second liquid transfer element 210B is in thermal connection with the second heating element 220B. Electrical conductors 230A, 230B electrically couple the heating elements 220A, 220B to electrical contacts (not shown) exposed through, positioned on, or integral to the housing 240. When the vaporizing unit 20 is connected to the first part 10 (as shown in FIG. 1B), the heating element 220 is electrically coupled with the circuitry 120 and power supply 110. The heating elements 220A, 220B may be connected in any suitable manner, such as in parallel, in series, or separately coupled to electrical circuitry 120.

The capsule 30 comprises a housing 310 defining a reservoir 300 in which a liquid aerosol-forming substrate (not shown) is stored. When the capsule 30 is connected to the vaporizing unit 20, the reservoir 300 and thus the aerosol-forming substrate is in fluid communication with the liquid transfer elements 210A, 210B.

The capsule 30 may include valves 399 configured to be closed when the vaporizing unit 20 and capsule 30 are not connected (such as in FIG. 1A) and configured to be open when the vaporizing unit 20 and capsule 30 are connected (such as in FIG. 1B). The valves 399 are aligned with distal openings in the capsule 30 and proximal openings in the vaporizing unit 20 such that when the valves are open, liquid aerosol-forming substrate in the reservoir 300 is in communication with liquid transfer elements 210A, 210B.

The vaporizing unit 20 includes proximal protruding elements 249 configured to be received in recesses 349 of the capsule 30 to securely couple the vaporizing unit 20 and the capsule 30. A mechanism (not shown) coupled to valve 349 may be positioned in one or more recesses 349 such that when protruding element 249 is inserted into recess 349, the valve 399 opens and when protruding element 249 is withdrawn from recess 349, the valve 399 closes.

Also shown in FIGS. 1A and 1B are passageways for air or aerosol flow through the system 100. The vaporizing unit 20 comprises inlets in housing in communication with passageway 215 that extends to the proximal end of the vaporizing unit 20. A central passageway 315 extends through the capsule 30 and is in communication with the passageway 215 of the vaporizing unit 20 when the vaporizing unit 20 and the capsule 30 are connected. The cover 40 comprises a central passageway 415. The central passageway 415 of the cover 40 is in communication with the central passageway 315 of the capsule 30 when the cover 40 is disposed over the capsule 30.

In at least one example embodiment, as depicted in FIGS. 1A-C, the cover 40 is configured to be disposed over the vaporizing unit 20 and the capsule 30. In at least one example embodiment, a smooth transition is formed across the outer surface of the system 100 at the transition between the cover 40 and the first part 10. The cover 40 may be maintained in position in any suitable manner, such as such as threaded engagement, snap-fit engagement, interference-fit engagement, magnetic engagement, or the like to any one or more of the first part 10, vaporizing unit 20, or capsule 30 (engagement not shown).

Figure 2A:
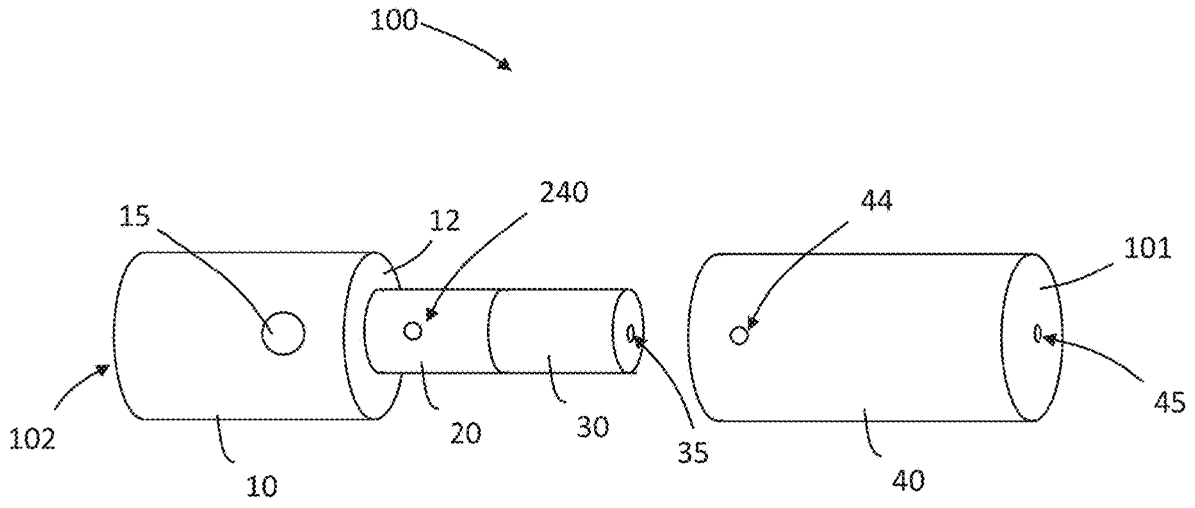
FIG. 2A shows the parts connected and the cover removed according to at least one example embodiment.
Figure 2B:
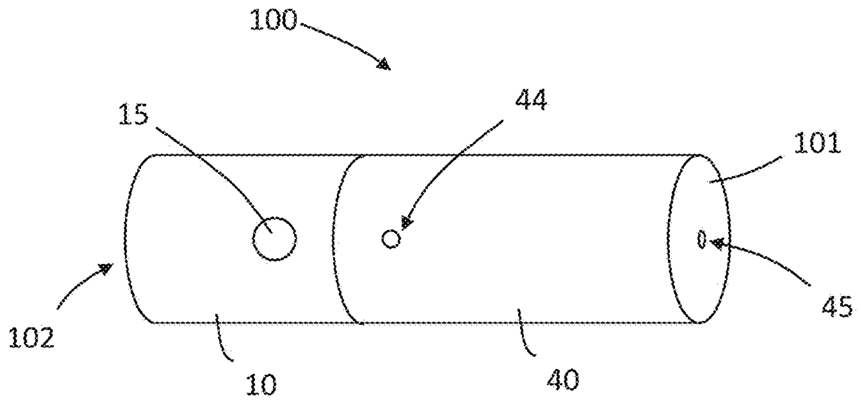
FIG. 2B shows the system with the cover secured in place according to at least one example embodiment.

Referring now to FIGS. 2A-B, an aerosol-generating system 100 may include a first part 10, a vaporizing unit 20, a capsule 30 and a cover 40. The parts are generally as described with regard to FIGS. 1A-C. In at least one example embodiment, (not depicted) the components of the vaporizing unit may be included in the capsule, and the system would not include a separate vaporizing unit.

The connected system depicted in FIGS. 2A-B extends from a mouth end 101 to a distal end 102. The housing of the capsule 30 defines an opening 35 in communication with a passage through the length of the capsule 30. The passage defines a portion of an aerosol flow path through the system 100. The housing of the vaporizing unit 20 defines an air inlet 240 in communication with a passage through the capsule 20. The passage through the vaporizing unit 20 is in communication with the passage through the capsule 30. The cover 40, which is configured to cover the vaporizing unit 20 and the capsule 30, comprises a sidewall defining an air inlet 44 that is in communication with the air inlet 240 of the vaporizing unit 20 when the cover 40 is secured in place relative to the other parts of the system. The housing of the cover 40 also defines a mouth end opening 45 that is in communication with the passage through the capsule 30. Accordingly, when an adult vaper draws on the mouth end 101 of the system 100, air enters inlet 44 of cover 40, then enters inlet 240 of the vaporizing unit 20, flows through the passage in the vaporizing unit 20, through the passage in the capsule 30, through the opening 35 at the proximal end of the capsule, and through the mouth end opening 45.

In at least one example embodiment, (not shown), air inlets may be formed in the housing of the first part and a passage extends through the housing to a passage in the vaporizing unit.

The first part 10 of the aerosol-generating system depicted in FIGS. 2A-B includes a button 15 that may be depressed to activate, and optionally, to deactivate the system. The button 15 is coupled to a switch of the circuitry of the first part 10.

Also shown in the system 100 depicted in FIG. 2A, the housing of the first part 10 defines a rim 12 at the proximal end. The distal end of the cover 40 contacts the rim 12 when the cover 40 is secured in place over the vaporizing unit 20 and the capsule 30. In at least one example embodiment, the size and shape of the outer edge of the rim 12 of the housing of the first part 10 is substantially the same as the size and shape of the outer edge of the distal end of the cover 40 so that a smooth along the outer surface of the system is formed at the junction of the first part and the cover.

Figure 3:
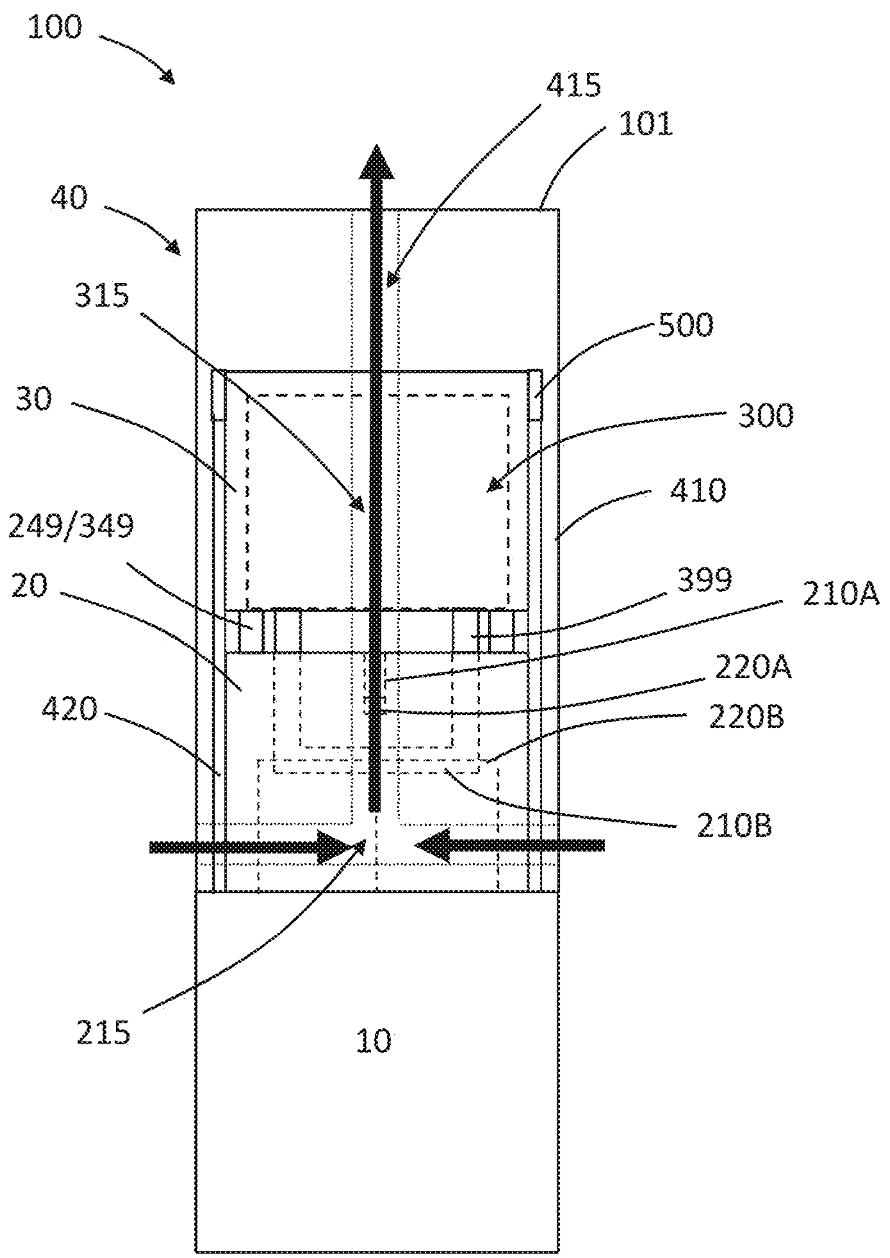
FIG. 3 is a schematic sectional view of an aerosol-generating system having connected parts and cover, and illustrating a flow path according to at least one example embodiment.

Referring now to FIG. 3, a flow path through the system 100 is illustrated by thick arrows. As in FIGS. 1A-C and 2A-B, the system includes a first part 10, vaporizing unit 20, capsule 30, and cover 40 disposed over the vaporizing unit 20 and the capsule 30 and in contact with a rim of the first part 10. In some example embodiments (not depicted), the components of the vaporizing unit may be included in the capsule, and the system might not include a separate vaporizing unit. When the parts of the system are connected, heating elements 220A, 220B are coupled to control electronics and power supply (not shown) of first part 10, valves 399 are open to allow liquid aerosol-forming substrate to flow to liquid transfer elements 210A, 210B. Valves 399 may be opened by interaction of protruding elements 249 with mechanism (not shown) in recesses 349.

When an adult vaper draws on the mouth end 101, fresh air enters into the system through a sidewall 410 of the cover, such as through an air inlet 44 as depicted in FIG. 2A. The air may then flow into the vaporizing unit 20, such as through inlet 240 as depicted in FIG. 2A, and through a passage 215 in vaporizing unit 20 with which liquid transfer elements 210A, 210B are in communication. The liquid transfer elements 210A, 210B which carry aerosol-forming substrate may be heated by heating elements 220A, 220B to cause aerosol to be generated from the heated substrate. The aerosol may be entrained in the air, which flows through a passage 315 in the capsule 30, through a passage 415 in the cover 40 and out of the mouth end 101, such as through mouth end opening 45 as depicted in FIG. 2B. The first 220A and second 220B heating elements are mounted in the flow passage of the system, spaced apart in the direction of flow through the passage.

Figure 4:
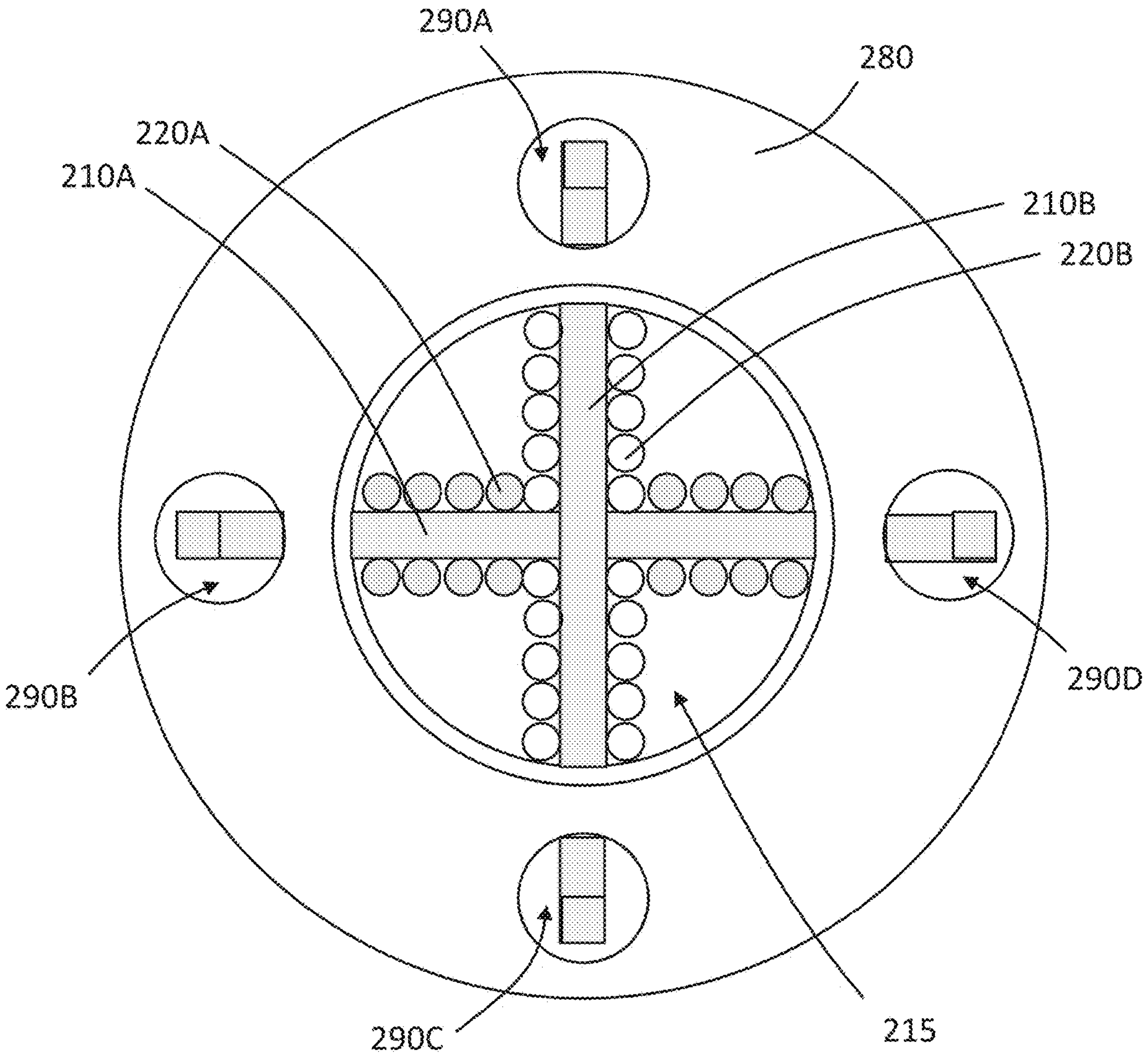
FIG. 4 is a schematic face view of an example of a vaporizing unit showing liquid transfer elements disposed under proximal end plate according to at least one example embodiment.

Referring now to FIG. 4, a top-down view of a vaporizing unit is shown. Liquid transfer elements 210A, 210B and heating elements 220A, 220B are depicted, but other components are not shown for purposes of illustration. The liquid transfer elements 210A, 210B and heating elements 220A, 220B are disposed under proximal end plate 280, which defines a central opening 215 in communication with the flow path and openings 290A, 290B, 290C, 290D that are configured to be longitudinally aligned with corresponding distal end openings of a reservoir when vaporizing unit is connected to a capsule. As such, the proximal end plate 280 forms part of a capsule or reservoir connecting end of the vaporizing unit. The first and second heating elements 220A, 220B are spaced at a distance from the proximal end plate 280 in the direction of a longitudinal axis of the vaporizing unit. The central portions of the first and second liquid transfer elements 210A, 210B are configured to extend in directions substantially perpendicular to the longitudinal axis. The first and second end portions of the first and second liquid transfer elements 210A, 210B extend between the central portions at the first and second heating elements 220A, 220B and the openings of the proximal end plate 280, substantially in the direction of a longitudinal axis of the vaporizing unit. As such the first and second end portions of the first and second liquid transfer elements 210A, 210B are configured to deliver liquid aerosol-forming substrate from the reservoir to the first and second heating elements 220A, 220B when the vaporizing unit is connected to a capsule. First and second ends of the liquid transfer elements 210A, 210B are positioned to be aligned with openings 290A, 290B, 290C, 290D such that each end may be separately fed, at least to some extent, from the reservoir. Heating elements 220A, 220B are depicted as coils wrapped around liquid transfer elements 210A, 210B.

As can be seen from FIG. 4, the arrangement of the liquid transfer elements 210A, 210B in a non-aligned manner increases the area of the liquid transfer elements that will be exposed to flow parallel to the longitudinal axis of the system through opening 215 relative to the area that would be exposed if the liquid transfer elements 210A, 210B were stacked in a parallel arrangement.

Figure 5:
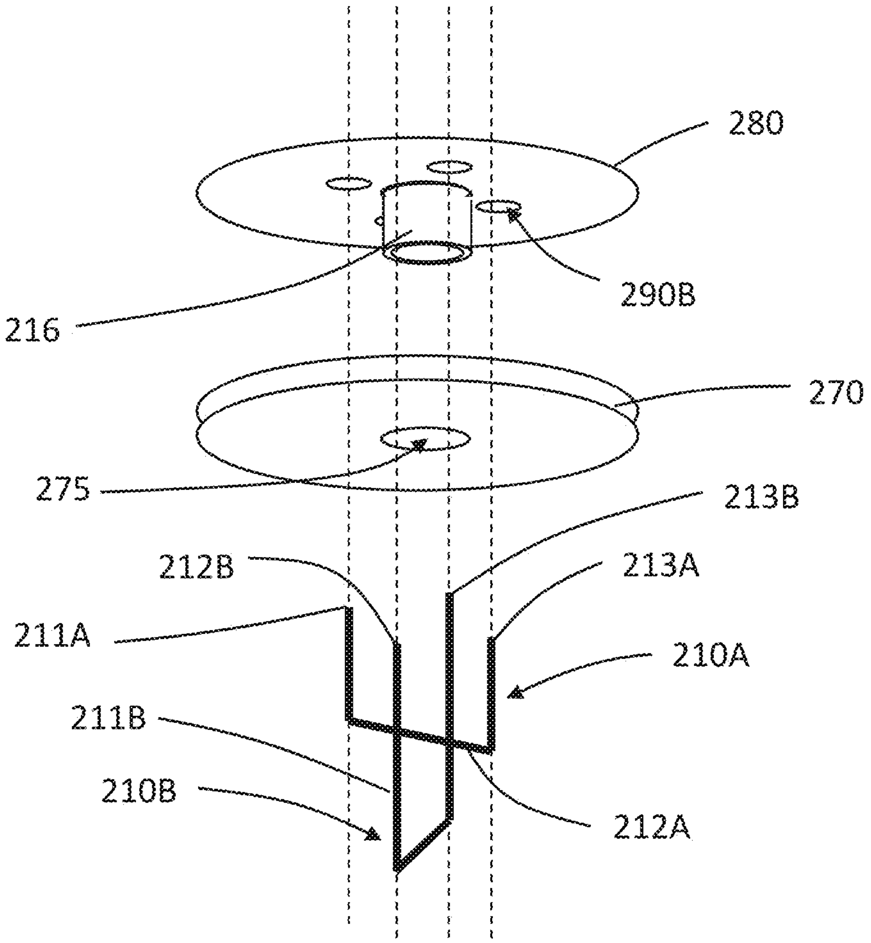
FIG. 5 is a schematic perspective exploded view showing components of a vaporizing unit according to at least one example embodiment.

Referring now to FIG. 5, some parts of a vaporizing unit are shown. The vaporizing unit comprises a proximal end plate 280 (such as depicted in FIG. 4), a pad of liquid retention material 270, for example capillary material, and first 210A and second 210B liquid transfer elements. The end plate 280 and the liquid retention material 270 are arranged at a reservoir connecting end of the vaporizing unit. An annular element 216 extends from an inner surface of the plate 280. Annular element 216 may serve to separate components of the fluid flow path of the liquid aerosol-forming substrate from the aerosol path, which includes flow through annular member 216. The liquid retention material 270 forms a disc having two opposing substantially planar surfaces, and includes a central opening 275 configured to be disposed about the annular member 216. Each of the first end 211A and second end 213A of the first liquid transfer element 210A and the first end 211B and second end 213B of the second liquid transfer element 210B substantially lie on a common plane, such that each end contacts a substantially planar surface of the liquid retention material 270. Each end of the first and second liquid transfer elements 210A, 210B contacts the liquid retention material 270 at a location longitudinally aligned with an opening, such as opening 290B, that is in fluid communication with the reservoir, in use. The first and second end portions of each liquid transfer element 210A, 210B carry liquid aerosol-forming substrate to the respective central portions 212A, 212B. The central portion 212B of the second liquid transfer element 210B extends further from the liquid retention material 270, and thus further from the reservoir, than the central portion 212A of the first liquid transfer element 210A. In this example, the first and second liquid transfer elements comprise fused silica wicks comprising a bundle of silica fibers. The diameter of the wick of the second liquid transfer element is greater than that of the wick of the first liquid transfer element to facilitate the transport of liquid to the second heating element. In at least one example embodiment, the second liquid transfer element 210B has a diameter of about 3.5 mm, while the diameter of the first liquid transfer element 210A is about 2.5 mm.

Figure 6:
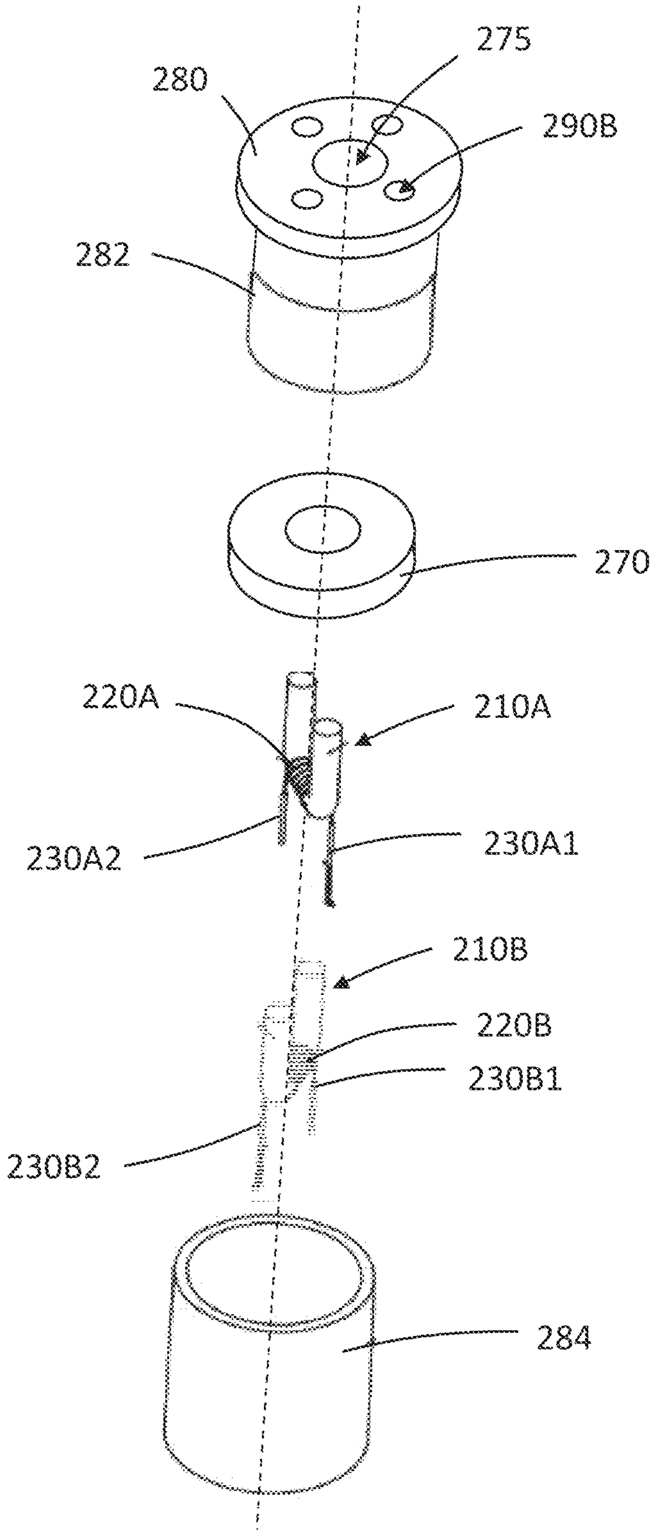
FIG. 6 is a schematic perspective exploded view showing components of a vaporizing unit according to at least one example embodiment.

Referring now to FIG. 6, parts of a vaporizing unit are shown. The vaporizing unit includes a distal end plate 280 and an annular sidewall 282 extending distally from the plate 280. The plate 280 defines an aerosol flow path opening 275 and fluid flow path openings, such as opening 290B, configured to be in fluid communication with a reservoir. The annular sidewall 282 is configured to receive a liquid retention material 270, which may be placed in contact with the inner surface of the plate 280. The liquid retention material 270 comprises a mat of polymer fibers, for example PET fibers. Annular sidewall 282 is also configured to receive first 210A and second 210B liquid transfer elements. Ends of first 210A and second 210B liquid transfer elements are configured to contact liquid retention material 270 at positions longitudinally aligned with fluid openings of plate 280, such as opening 290B. A first heating element 220A, depicted as a coil, is in contact with a central portion of the first liquid transfer element 210A. The first heating element 220A is electrically coupled to first 230A1 and second 230A2 conductors, which may ultimately electrically couple with electronic circuitry and power supply. A second heating element 220B, depicted as a coil, is in contact with a central portion of the second liquid transfer element 210B. The second heating element 220B is electrically coupled to first 230B1 and second 230B2 conductors, which may ultimately electrically couple with electronic circuitry and power supply. The vaporizing unit may include an annular outer housing 284 configured to receive the annular sidewall 282 and other components and to abut plate 280 at a rim about the sidewall 282.

Various modifications and variations of the invention will be apparent to those skilled in the art without departing from the scope and spirit of the invention. Although the invention has been described in connection with specific example embodiments, it should be understood that the invention as claimed should not be unduly limited to such specific embodiments. Indeed, various modifications of the described modes for carrying out the invention which are apparent to those skilled in the mechanical arts, electrical arts, and aerosol generating article manufacturing or related fields are intended to be within the scope of the following claims.

We claim:

1. A vaporizing unit for an aerosol-generating system, the vaporizing unit comprising:
- an end plate including
  - a central opening, and
  - two or more other openings at least partially surrounding the central opening in a horizontal direction, the two or more other openings extending through the end plate in a vertical direction;
- a first liquid transfer element aligned with a first opening of the two or more other openings; and
- a second liquid transfer element aligned with a second opening of the two or more other openings.

2. The vaporizing unit of claim 1, wherein the vaporizing unit further comprises:
- a first heating unit in contact with the first liquid transfer element, and
- a second heating unit in contact with the second liquid transfer element.

3. The vaporizing unit of claim 2, wherein the first heating unit is electrically coupled to one or more first conductors.

4. The vaporizing unit of claim 3, wherein the second heating unit is electrically coupled to one or more second conductors.

5. The vaporizing unit of claim 2, wherein
- the first liquid transfer element includes,
  - a first end, and
  - a second end, the first end of the first liquid transfer element is configured to be aligned with the first opening of the two or more other openings, and
- the two or more other openings further comprises:
  - a third opening that is aligned with the second end of the first liquid transfer element.

6. The vaporizing unit of claim 5, wherein the first liquid transfer element further comprises:
- a middle portion between the first end and the second end of the first liquid transfer element, the middle portion aligned with the central opening, the first heating unit being in contact with the middle portion.

7. The vaporizing unit of claim 6, wherein the first heating unit includes a coil wound around the middle portion of the first liquid transfer element.

8. The vaporizing unit of claim 6, wherein the first liquid transfer element has a U-shape, a C-shape, or a V-shape.

9. The vaporizing unit of claim 6, wherein the second liquid transfer element includes, a first end, and a second end, the first end of the second liquid transfer element aligned with the second opening of the two or more other openings, and the two or more other openings further comprises:

a fourth opening aligned with the second end of the second liquid transfer element.

10. The vaporizing unit of claim 9, wherein the second liquid transfer element further comprises:

a middle portion between the first end and the second end of the second liquid transfer element, the middle portion aligned with the central opening, the first heating unit being in contact with the middle portion.

11. The vaporizing unit of claim 10, wherein the second heating unit includes a coil wound around the middle portion of the first liquid transfer element.

12. The vaporizing unit of claim 10, wherein the second liquid transfer element has a U-shape, a C-shape, or a V-shape.

13. The vaporizing unit claim 10, wherein the first liquid transfer element overlaps a portion of the second liquid transfer element.

14. A vaporizing unit for an aerosol-generating system, the vaporizing unit comprising:

an end plate including a central opening, and two or more other openings at least partially surrounding the central opening;

a first liquid transfer element aligned with a first opening of the two or more other openings; and a second liquid transfer element aligned with a second opening of the two or more other openings, a first heating unit in contact with the first liquid transfer element, a second heating unit in contact with the second liquid transfer element, wherein the first liquid transfer element includes, a first end, a second end, the first end of the first liquid transfer element is configured to be aligned with the first opening of the two or more other openings, and a middle portion between the first end and the second end of the first liquid transfer element, the middle portion aligned with the central opening, the first heating unit being in contact with the middle portion, wherein the second liquid transfer element includes, a first end, a second end, the first end of the second liquid transfer element aligned with the second opening of the two or more other openings, and a middle portion between the first end and the second end of the second liquid transfer element, the middle portion aligned with the central opening, the first heating unit being in contact with the middle portion, wherein the two or more other openings further include a third opening that is aligned with the second end of the first liquid transfer element, and a fourth opening aligned with the second end of the second liquid transfer element, wherein the end plate includes a first portion of the central opening, and wherein the vaporizing unit further comprises:

a pad of liquid retention material that is parallel with the end plate, the pad of liquid retention including a second portion of the central opening.

15. The vaporizing unit of claim 14, wherein the pad of liquid retention material is between the end plate and both the first and second liquid transfer elements.

16. The vaporizing unit of claim 15, wherein the vaporizing unit further comprises:

an annular element that forms part of the central opening and physically separates the end plate and the pad of liquid retention material.

17. The vaporizing unit of claim 14, wherein the first and second ends of the first liquid transfer element share a common plane with the first and second ends of the second liquid transfer element.

18. The vaporizing unit of claim 17, wherein the first and second ends of the first liquid transfer element and the first and second ends of the second liquid transfer element make physical contact with the pad of liquid retention material.

19. The vaporizing unit of claim 18, wherein the second liquid transfer element is longer than the first liquid transfer element.

20. The vaporizing unit of claim 18, wherein the first liquid transfer element has a first average diameter, and the second liquid transfer element has a second average diameter that is larger than the first average diameter.

* * * * *